US012268648B1

(12) United States Patent
Mota

(10) Patent No.: US 12,268,648 B1
(45) Date of Patent: Apr. 8, 2025

(54) TACTILE STIMULATION VISION

(71) Applicant: Julio Constantino Mota, Coral Springs, FL (US)

(72) Inventor: Julio Constantino Mota, Coral Springs, FL (US)

( * ) Notice: Subject to any disclaimer, the term of this patent is extended or adjusted under 35 U.S.C. 154(b) by 0 days.

(21) Appl. No.: 18/677,998

(22) Filed: May 30, 2024

Related U.S. Application Data

(60) Provisional application No. 63/525,570, filed on Jul. 7, 2023.

(51) Int. Cl.
| | |
|---|---|
| *A61H 3/06* | (2006.01) |
| *G06T 7/20* | (2017.01) |
| *G06T 7/70* | (2017.01) |
| *G06V 10/764* | (2022.01) |
| *G06V 40/10* | (2022.01) |
| *G08B 6/00* | (2006.01) |

(52) U.S. Cl.
CPC .............. *A61H 3/061* (2013.01); *G06T 7/20* (2013.01); *G06T 7/70* (2017.01); *G06V 10/764* (2022.01); *G06V 40/10* (2022.01); *G08B 6/00* (2013.01); *A61H 2003/063* (2013.01); *A61H 2201/0207* (2013.01); *A61H 2201/0214* (2013.01); *A61H 2201/1619* (2013.01); *A61H 2201/5043* (2013.01); *A61H 2201/5092* (2013.01); *G06T 2207/30196* (2013.01)

(58) Field of Classification Search
CPC .... A61H 3/061; A61H 2003/063; G06T 7/20; G06T 2207/30196
See application file for complete search history.

(56) References Cited

U.S. PATENT DOCUMENTS

| | | | |
|---|---|---|---|
| 3,654,477 A | 4/1972 | Benjamin, Jr. | |
| 9,996,730 B2 * | 6/2018 | Lee | G06V 20/64 |
| 11,181,381 B2 * | 11/2021 | Andreuzzi | G01C 21/20 |
| 11,335,210 B2 * | 5/2022 | Wexler | G09B 21/006 |
| 11,371,859 B1 * | 6/2022 | Amariei | G01C 21/3629 |
| 11,852,500 B1 * | 12/2023 | Pomes | G01C 21/3632 |
| 11,928,981 B2 * | 3/2024 | Fan | A61F 9/08 |
| 2015/0125831 A1 * | 5/2015 | Chandrashekhar Nair | G09B 21/004 434/114 |

(Continued)

FOREIGN PATENT DOCUMENTS

| | | |
|---|---|---|
| CN | 101498845 A | 8/2009 |
| CN | 202533672 U | 11/2012 |

(Continued)

*Primary Examiner* — Mohamed A. Wasel
(74) *Attorney, Agent, or Firm* — John Rizvi; John Rizvi, P.A.—The Patent Professor ®

(57) ABSTRACT

A method, a system, and a computer program product for enabling improved perception of the surrounding environment by a visually impaired subject is disclosed. A controller executing an enhanced environment sensing (EES) utility/module receives images of a scene surrounding the subject from a camera integrated within glasses (also referred to as spectacles) worn by the subject. The controller identifies objects within the captured images and determines the position and motion of the detected objects relative to the subject. The controller relays to the subject indication of the detected object(s) and relative position/motion via sensory responses in the form of tactile, haptic, vibratory, thermal and/or audio feedback via a sensory output device.

19 Claims, 9 Drawing Sheets

(56) References Cited

U.S. PATENT DOCUMENTS

2017/0367921 A1* 12/2017 Matsuno ............ G02B 27/0172
2023/0419859 A1* 12/2023 Fan ...................... G09B 21/003

FOREIGN PATENT DOCUMENTS

| | | |
|---|---|---|
| CN | 202563194 U | 11/2012 |
| CN | 102885685 A | 1/2013 |
| CN | 203164544 U | 8/2013 |
| CN | 103720576 A | 4/2014 |
| CN | 103385795 B | 7/2015 |
| CN | 111643324 A | 9/2020 |
| WO | 2015169072 A1 | 11/2015 |

* cited by examiner

TACTILE STIMULATION VISION

CROSS-REFERENCE TO RELATED APPLICATION

This application claims the benefit of U.S. Provisional Patent Application No. 63/525,570 filed Jul. 7, 2023, which is hereby incorporated by reference herein in its entirety.

FIELD OF THE INVENTION

The present invention relates generally to aids for the visually impaired, and more particularly, to wearable navigation aids for the visually impaired.

BACKGROUND OF THE INVENTION

Everyone faces challenges in life. However, blind people seem to experience many more challenges and/or greater difficulties when facing life's challenges. One of the biggest challenges for a blind person, especially the one with the complete loss of vision, involves navigating around places. Blind people can roam easily around their homes because they know the position of everything in the house. People living with and visiting blind people must make sure not to move things around without informing or asking the blind person.

Besides navigating familiar spaces such as at home, the blind or visually impaired often has to navigate public and less familiar spaces. These types of unfamiliar and/or dynamic environments present a great navigational challenge to the visually impaired. The visually impaired primarily navigates these types of environments using the same aid/cane he uses to navigate his home environment. Unfortunately, a cane cannot enable the visually impaired individual to confidently navigate in such a dynamic changing environment having unfamiliar objects in unexpected locations and/or quickly changing locations.

Ideally, it would be extremely useful to provide a system that provides guidance to a visually impaired user in various types of environments including dynamically changing environments. In addition, the system should alert the user based on urgent situations or conditions in the environment.

Accordingly, there is need for a solution that helps to provide a visually impaired user with navigation guidance in various types of environments including dynamically changing environments, as well as alert the user to urgent situations or conditions in the environment.

SUMMARY OF THE INVENTION

The present invention is directed to a method, a system, and a computer program product for enabling improved perception of the surrounding environment by a visually impaired subject is disclosed. A controller executing an enhanced environment sensing (EES) utility/module receives images of a scene surrounding the subject from a camera integrated within a personal item placed on the subject (e.g., glasses or spectacles worn by the subject). The controller identifies objects within the captured images and determines the motion of the detected objects relative to the subject. The controller relays to the subject indication of the detected object(s) and relative motion via sensory responses in the form of tactile, haptic, vibratory, thermal and/or audio feedback via a sensory output device. According to an implementation, the sensory output device comprises an electro-mechanical circuit module integrated with a heating component and can be attached to the user's stomach. Thus, when the cameras sense motion by a detected object, the controller will manipulate pins included within the circuit module to physically interact with the subject to inform him of a presence of the detected object and the direction of the object's motion relative to the subject. In particular, the controller may be configured to cause selected pins within a grid-like arrangement of pins to be extended in a specific order to facilitate object perception via physical contact with the subject. In addition, the controller may manipulate the pins to indicate when the object is moving closer to or further away from the subject. According to an aspect, the controller may heat/cool the pins to various temperatures to indicate a proximity of the object to the subject. According to an aspect, the controller displays images of the captured scene on a screen on an outer side of the sensory output device.

According to one or more aspects, the controller may be configured to identify selected types of objects which may be located within a specified range of the subject within the surrounding environment.

According to an aspect, the controller is configured to translate information about identified/recognized objects and position and movement of the identified objects relative to the subject into sensory indication information that the sensory output device can utilize to provide sensory output.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present disclosure is directed toward facilitating improved perception of the surrounding environment by a visually impaired subject.

Figure 1:
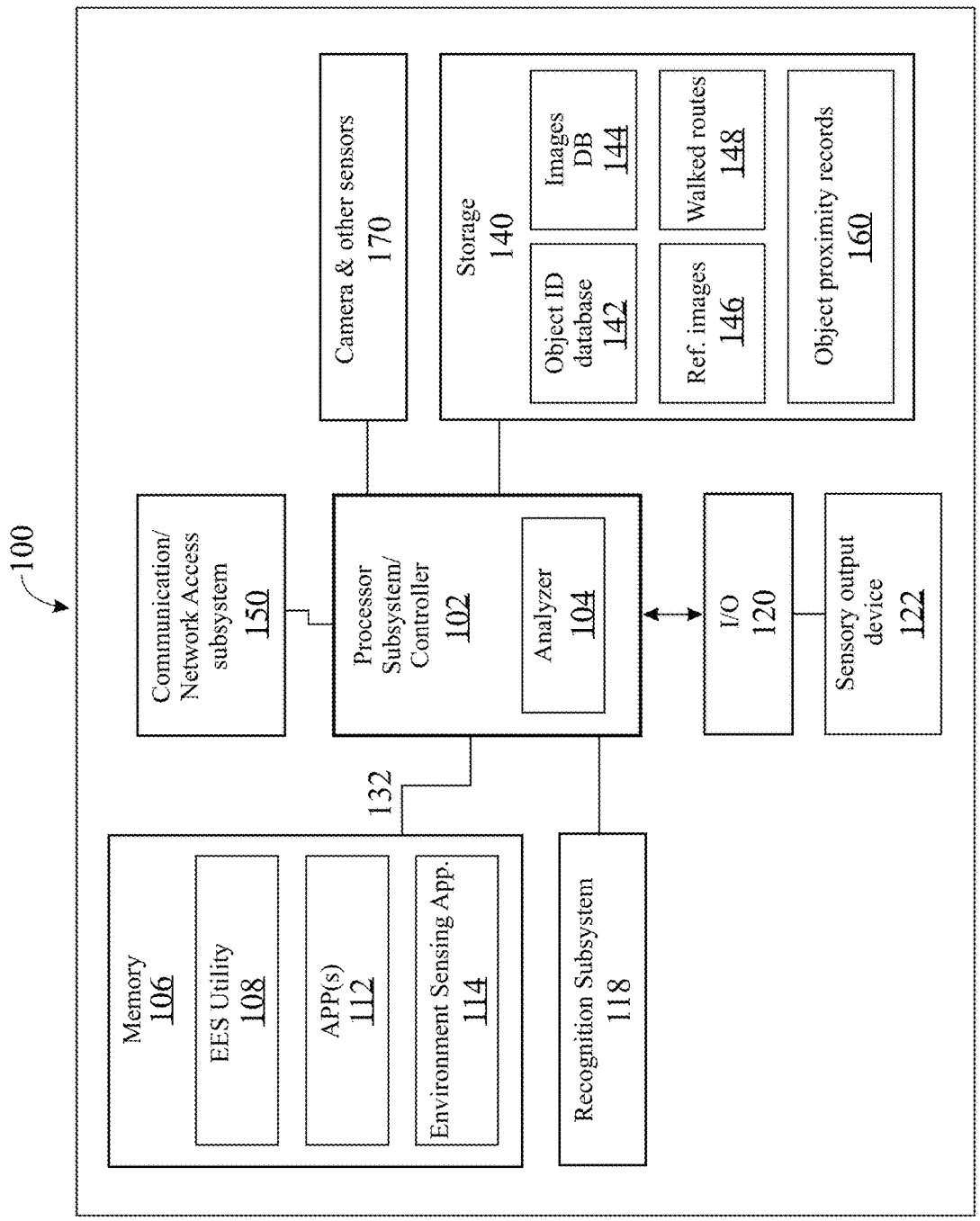
FIG. 1 illustrates a block diagram representation of an example environment sensing data processing system within which certain features of the present disclosure can be implemented, according to one or more embodiments.

With reference now to the figures, and beginning with FIG. 1, there is depicted a block diagram representation of an example environment sensing data processing system (DPS), as utilized within one embodiment. DPS may be a server, a personal computer, a portable device, such as a personal digital assistant (PDA), a smart phone, and/or other types of electronic devices that may generally be considered processing devices or computing systems/devices. As illustrated, DPS 100 comprises at least one processor/controller subsystem 102 connected to system memory 106 via system interlink/bus 132. DPS 100 executes one or more computer programs/applications to facilitate improved perception of the surrounding environment by a visually impaired subject.

In one or more embodiments, DPS 100, which is managed by processor/controller subsystem 102, also includes communication subsystem 150, data storage subsystem 140, Recognition Subsystem 118, Cameras, and other sensors 170, and input/output (I/O) subsystem 120 and sensory output device 122. As shown, an analyzer module 104 is used to support the data analysis functionality of DPS 100. Processor/controller subsystem 102 executes program code to provide operating functionality of DPS 100. The software and/or firmware modules have varying functionality when their corresponding program code is executed by processor subsystem 102 or secondary processing devices (not explicitly shown) within DPS 100.

As illustrated, the DPS 100 includes an I/O subsystem 120. The I/O subsystem includes user interface devices including output devices such as audio output device(s)/speaker, and a display device (not shown). In one or more implementations, the display device includes touch screen functionality enabling the display device to function as both an input device and an output device. In addition, I/O subsystem 120 includes input devices including a microphone, and a keypad.

Figure 2:
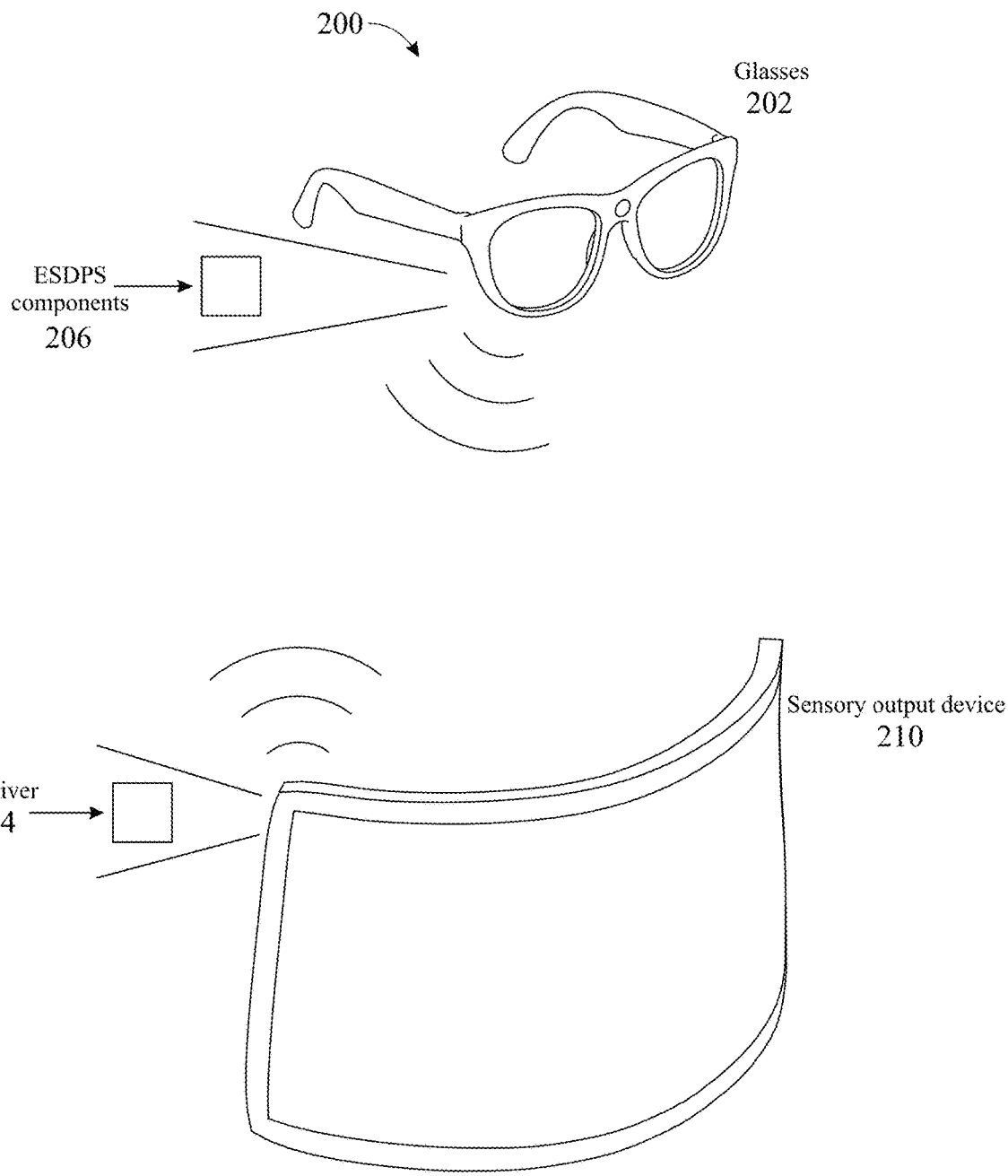
FIG. 2 illustrates an example implementation of an environment sensing data processing system, according to one or more embodiments of the disclosure.

According to one or more aspects, the DPS 100 can be connected/paired to an external I/O component such as a sensory output device 210 (FIG. 2). The DPS 100 and the sensory output device 210 are collectively referred to herein as an enhanced environment sensing (EES) system.

Processor subsystem 102 is communicatively coupled, via system bus/interlink 132, to device memory 106. In one or more embodiments, processor subsystem 102 is communicatively coupled via system interlink 132 to communication subsystem 150, data storage subsystem 140, and input/output subsystem 120. System interlink 132 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components.

Communication subsystem 150 may be configured to enable DPS 100 to communicate with a plurality of personal computing devices. The communication subsystem may include wired and/or wireless communication devices to facilitate networked communication. Communication subsystem 150 also includes a Network Access Module by which DPS 100 may connect to one or more access/external networks such as the Internet or wide area network (WAN), or an internal network such as an Ethernet (local area network LAN) or a Virtual Private Network (VPN).

In addition to the above described hardware components of DPS 100, various features of the invention are completed/supported via software (or firmware) code or logic stored within memory 106 or other storage and executed by Processor subsystem 102. Thus, for example, illustrated within memory 106 are a number of software/firmware/logic components, including an Environment Sensing Application/module 114 and other applications. In addition, memory 106 comprises an Enhanced Environment Sensing (EES) module/logic/utility 108. Device memory 106 further includes an operating system (OS) (not shown), a firmware interface, such as basic input/output system (BIOS) or Uniform Extensible Firmware Interface (UEFI), and firmware (not shown). Device memory 106 includes other computer data (not explicitly shown) used by the EES utility 108 and/or the environment sensing module 114.

Data storage subsystem 140 enables further storage and retrieval of data, instructions, and code. In particular, data storage subsystem 140 provides applications, program code, and stored data on nonvolatile storage that is accessible by processor subsystem 102. For example, data storage subsystem 140 can provide, for use by the EES utility 108, the object identification (ID) database 142, captured images (DB) 144, reference images database (DB) 146, subject walked routes record 148, and object proximity records 160. In addition, data storage subsystem 140 can provide a selection of program code and applications such as the environment sensing application 114, and other related application(s) that can be used to facilitate improved perception of the surrounding environment by the visually impaired. These applications can be loaded into device memory 106 for execution by processor subsystem 102.

In actual implementation, the EES logic 108 may be combined with the environment sensing application 114 and/or one or more Apps to provide a single executable component, collectively providing the various functions of each individual component when the corresponding combined component is activated. For simplicity, the EES logic/utility 108 is illustrated and described as a stand-alone or separate logic/firmware component, which provides specific functions, as described below.

The EES utility 108 facilitates improved perception of the surrounding environment by a visually impaired subject. The user/individual can be presented with audio, visual, tactile, haptic and/or vibratory responses during the various stages of processing captured sensor data and providing sensory output to indicate to a visually impaired subject position and movements of various objects detectable by an image capture device worn and/or carried by the subject. According to one or more aspects, the EES utility 108 may identify particular types of objects that may be located within a specified range of the subject within the surrounding environment. According to one or more aspects, the individual/user can be presented with aural content via the speakers.

Certain of the functions supported and/or provided by the EES utility/module 108 are implemented as processing logic (or code) executed by processor subsystem 102 and/or other device hardware, which processing logic enables the device to implement/perform those function(s). Among the software code/instructions/logic provided by the EES module 108, and which are specific to the disclosure, are: (a) logic for capturing, using an image capture device worn and/or carried by a subject, images of a scene from an environment of the subject; (b) logic for recognizing objects within the captured images; (c) logic for determining location and/or motion of identified objects relative to the subject; (d) logic for transmitting to a sensory output device indication of recognized object(s), and object location/motion relative to the subject; (e) logic for presenting images of identified objects exhibiting detected motion via display screen; (f) logic for triggering selected pins within a grid-like arrangement of pins to be extended in a specific order to facilitate object perception via physical contact with the subject; and (g) logic for heating/cooling the pins to various temperatures to indicate a proximity of the object to the subject. According to the illustrative embodiment, when Processor subsystem 102 executes the EES logic/module 108, DPS 100 initiates a series of functional processes that enable the above functional features as well as additional features/functionality. These features/functionalities are described in greater detail below within the description of FIGS. 2-9.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure.

FIG. 2 illustrates an example implementation of an environment sensing data processing system, according to one or more embodiments of the disclosure. The environment sensing data processing system (ESDPS) 200 comprises personal item 202 (e.g., a pair of glasses or spectacles) which is integrated with a number of ESDPS components 206 of the environment sensing DPS 100 (FIG. 1) including memory, a processor/controller 102 (FIG. 1), communication subsystem, and an image capture device. In addition, the ESDPS 200 includes a sensory output device 210 which is integrated with a receiver 214 to enable communication with the controller 102 integrated within personal item 202. According to an aspect, the receiver 214 operates/communicates using a specified frequency range. According to an implementation, the operating frequency range is 20 Hz-20000 Hz.

During operation, the controller 102 executing an enhanced environment sensing (EES) utility/module 108 is configured to receive images of a scene surrounding a subject from a camera integrated within the personal item 202 when worn and/or carried by the subject.

The controller 102 identifies objects within the captured images and determines the position and motion of the detected objects relative to the subject. According to an aspect, the controller 102 determines the position and movements of various objects detectable by the image capture device. According to one or more aspects, the controller 102 may be configured to identify selected types of objects which may be located within a specified range of the subject within the surrounding environment.

According to an aspect, the controller 102 is configured to translate information about identified/recognized objects and position and movement of the identified objects relative to the subject into sensory indication information that the sensory output device 210 can utilize to provide sensory output.

According to an aspect, the controller 102 is configured to relay to the subject sensory indication of the detected object(s) and relative position/motion via sensory output responses in the form of tactile, haptic, vibratory, thermal and/or audio feedback via the sensory output device 210. According to an implementation, the sensory output device comprises an electro-mechanical circuit module integrated with a heating component and can be attached to the subject's stomach.

According to an implementation, components of the environment sensing DPS 100 can be provided using a personal/laptop/tablet computer, and a smart-phone. According to an aspect, the environment sensing data processing apparatus is one or more of an Android platform apparatus and an IOS platform apparatus. According to an implementation, the personal item 202 may be paired with the sensory output device 210 via Bluetooth® or Wi-Fi.

Figure 3:
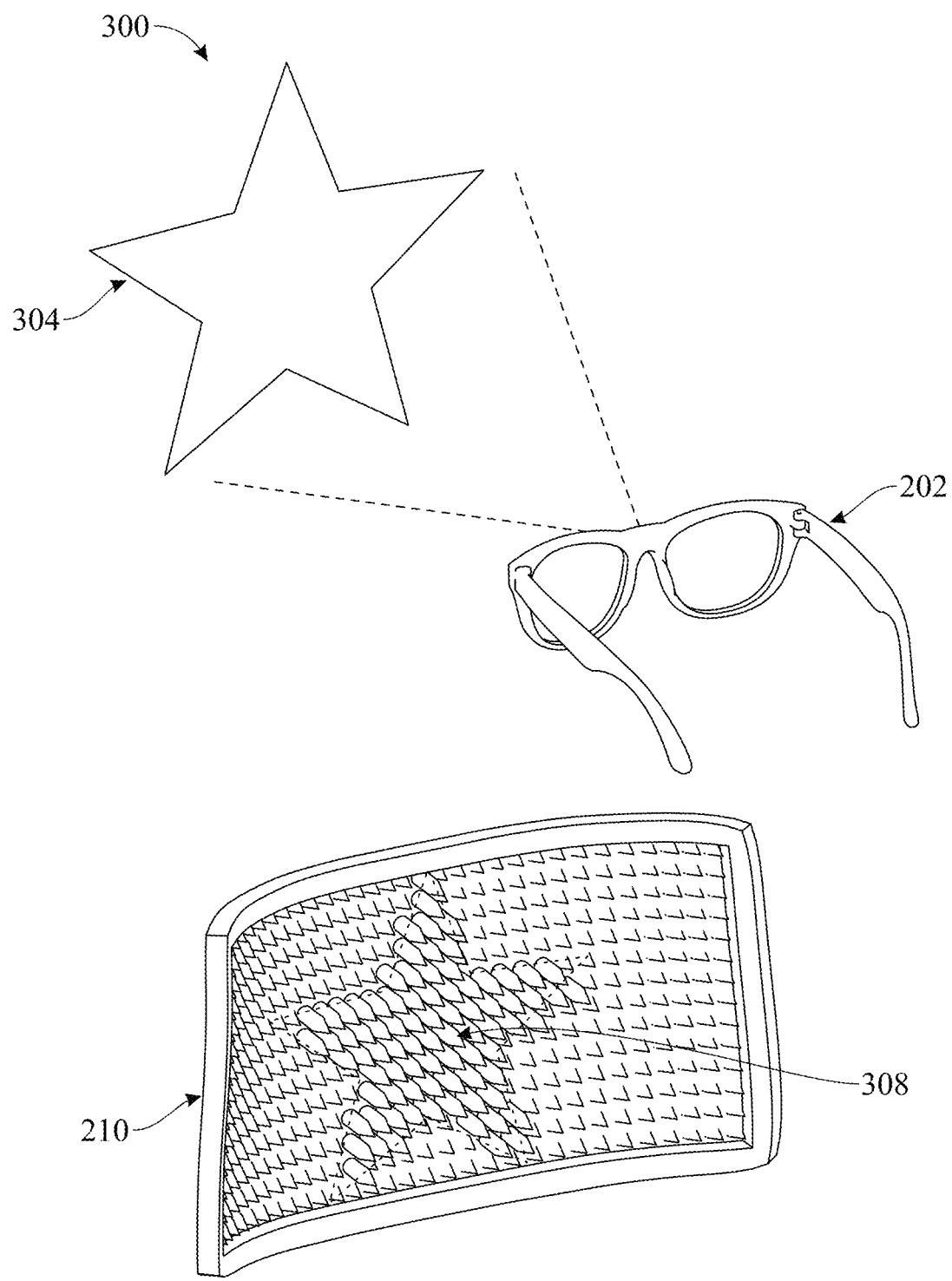
FIG. 3 illustrates an environment sensing DPS capturing an image of an object and sending indication of the captured object to a sensory output device to provide physically perceptible sensory output, according to one or more embodiments.

FIG. 3 illustrates an environment sensing DPS capturing an image of an object and sending indication of the captured object to a sensory output device to provide physically perceptible sensory output, according to one or more embodiments. View 300 shows a pair of eyeglasses at the personal item 202 and a sensory output device 210. A camera 170 (FIG. 1) is integrated within the personal item 202. In addition, the view 300 shows a star-shaped object 304. The personal item 202 is integrated with a controller 102 (FIG. 1) which communicates with the sensory output device 210. The camera 170, the controller 102 and the sensory output device 210 are components of the ESDPS 200 which uses the camera 170 to capture an image of the object 304. According to an aspect, the camera/lens 170 includes night vision capability and motion detection capability. According to an aspect, the camera/lens 170 is capable of detecting objects in an underwater environment.

During operation, the controller 102 executing an enhanced environment sensing (EES) utility/module 108 is configured to receive images of a scene surrounding a subject from a camera integrated within the personal item 202 when worn and/or carried by the subject.

The controller 102 identifies objects within the captured images and determines the position and motion of the detected objects relative to the subject. According to an aspect, the controller 102 determines the position and movements of various objects detectable by the image capture device. According to one or more aspects, the controller 102 may be configured to identify selected types of objects which may be located within a specified range of the subject within the surrounding environment.

According to an aspect, the controller 102 is configured to translate information about identified/recognized objects and position and movement of the identified objects relative to the subject into sensory indication information that the sensory output device 210 can utilize to provide sensory output.

According to an aspect, the controller 102 is configured to relay to the subject sensory indication of the detected object(s) and relative position/motion via sensory output responses in the form of tactile, haptic, vibratory, thermal and/or audio feedback via the sensory output device 210. According to an implementation, the sensory output device comprises an electro-mechanical circuit module integrated with a heating component and can be attached to the subject's stomach.

According to an implementation, the controller 102 sends indication of the captured object to a sensory output device 210 to cause the sensory output device 210 to rearrange pins into a specific pattern 308 to allow pinheads to make physical contact with the subject to facilitate object perception.

According to an implementation, the controller 102 is configured to enable the camera to operate in a "radar-like" fashion such that the controller 102 identifies objects within a detectable range of the camera and subject. The camera is detachable and can be placed on different parts of the body. The camera comprises and/or is housed within a small plastic circle that can be attached to various types of textured surfaces. The sensory output device 210 has a TV-like display on an outer side of the sensory output device 210 which can be positioned on or below a subject's chest. According to an implementation, the display is made of neon, xenon and argon gases combined with phosphor gas to provide the cells of which the display is constructed. According to an implementation, Cerium is used inside the TV-like display to improve the color of the screen. The electronics components and the case/housing components feature materials such as plastic, copper, tin, zinc, silicon, gold, and chromium. The TV-like display receives moving pictures from the lens of the camera and can present object content in one, two or three dimensions. The sensory output device/apparatus is designed to enable pinheads to be manipulated to facilitate a perception of movement in various directions such as up, down, right, left, forward and backward. In addition, pins with pinheads can be extended in a specific order to provide a vertically directed pattern and can be heated to various target temperatures. According to an aspect, a target temperature can be selected based on attributes of the body of the subject.

Figure 4:
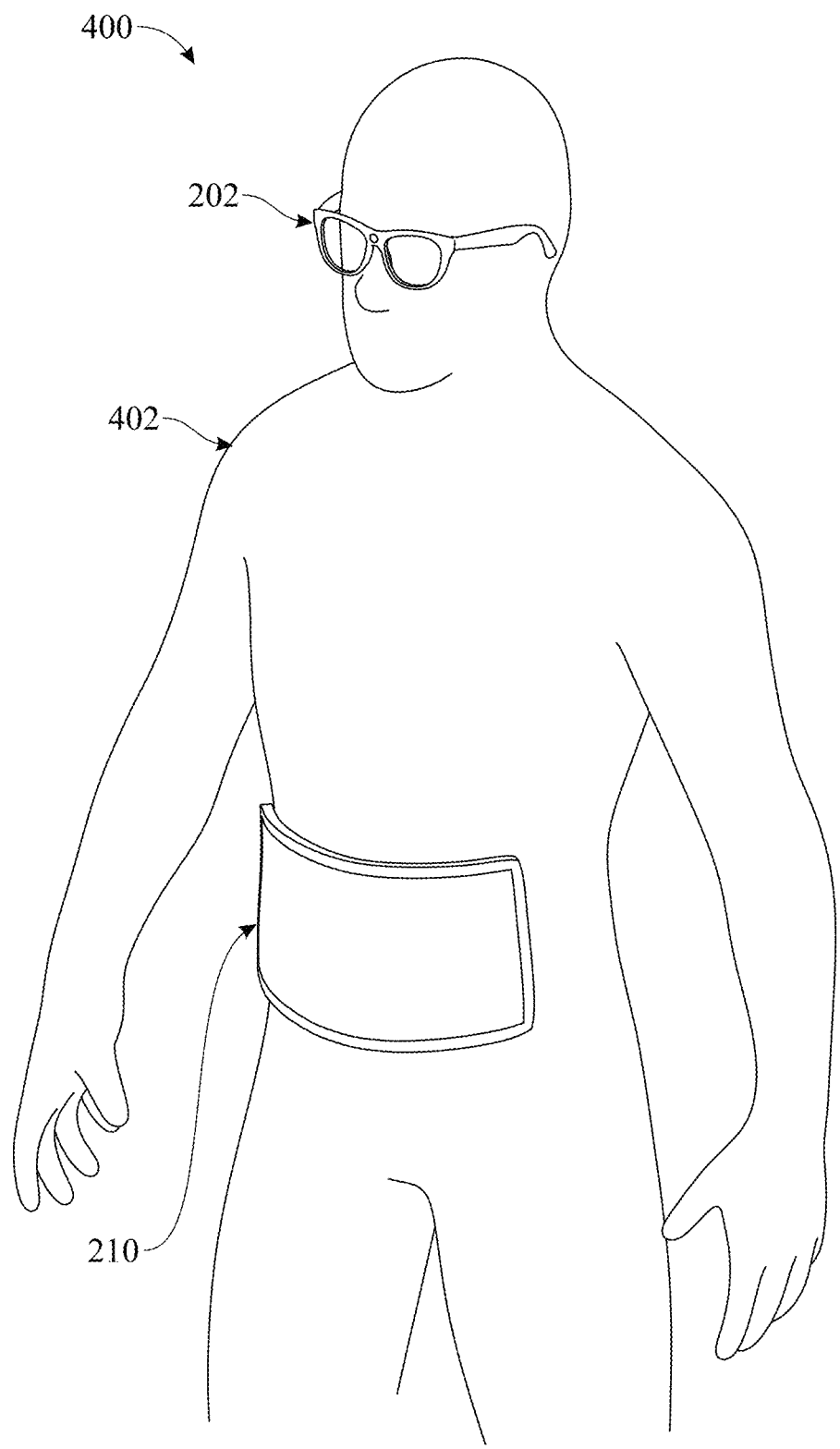
FIG. 4 illustrates a subject wearing glasses (also referred to as spectacles) integrated with an image capture device and carrying an attachable sensory output device near the stomach region, according to one or more embodiments.

FIG. 4 illustrates a subject wearing glasses/spectacle integrated with an image capture device and carrying an attachable sensory output device near the stomach region, according to one or more embodiments. The view 400 comprises a subject 402 wearing personal item 202 and sensory output device 210 which is secured to the subject's stomach region. According to an aspect, the personal item 202 and sensory output device 210 are components of the ESDPS 200 which facilitates improved perception of the surrounding environment by a visually impaired subject.

According to an aspect, a controller 102 executing an enhanced environment sensing (EES) utility/module 108 receives images of a scene surrounding subject 402 from a camera 170 integrated within personal item 202 placed on the subject 402. The controller 102 identifies objects within the captured images and determines the motion of the detected objects relative to the subject 402. The controller 102 relays to the subject 402 indication of the detected object(s) and the object's relative position/motion via sensory responses in the form of tactile, haptic, vibratory, thermal and/or audio feedback via a sensory output device 210.

Figure 5:
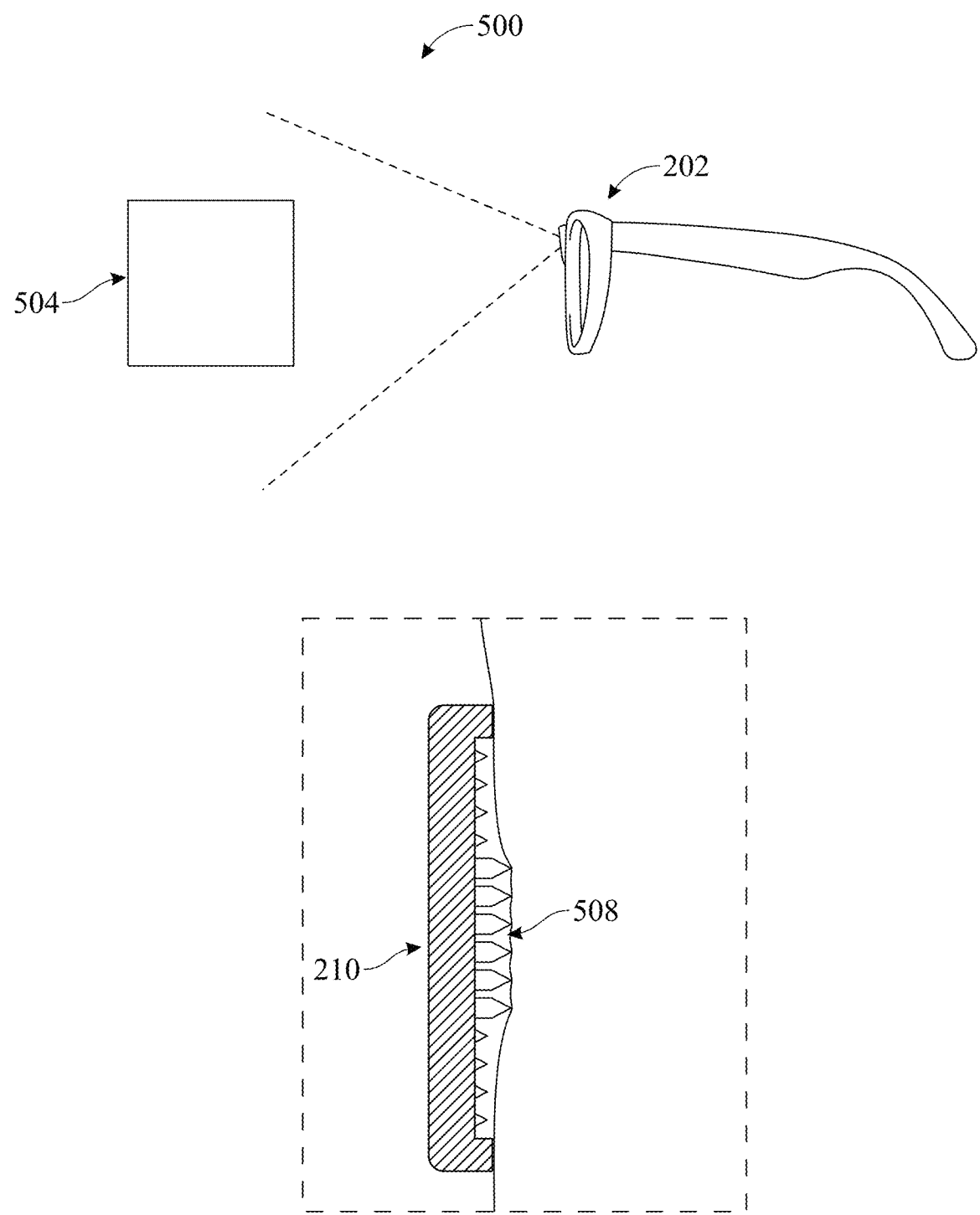
FIG. 5 illustrates an environment sensing DPS capturing an image of an object via a camera sub-system and sending indication of the captured object to a sensory output device to provide physically perceptible sensory output, according to one or more embodiments.

FIG. 5 illustrates an environment sensing DPS capturing an image of an object via a camera sub-system and sending indication of the captured object to a sensory output device to provide physically perceptible sensory output, according to one or more embodiments. A view 500 shows an image capture device integrated within personal item 202 capturing an image of an example object 504 which is a square-shaped object. In addition, as illustrated in FIG. 5, a side profile view of the sensory output device 210 is provided, enabling a viewer to clearly visualize an arrangement of pins on an inner side of the sensory output device 210.

During operation, the controller 102 executing an enhanced environment sensing (EES) utility/module 108 is configured to receive images of a scene surrounding a subject from a camera integrated within the personal item 202 when worn and/or carried by the subject.

The controller 102 identifies objects within the captured images and determines the position and motion of the detected objects relative to the subject. According to an aspect, the controller 102 determines the position and movements of various objects detectable by the image capture device. According to one or more aspects, the controller 102 may be configured to identify selected types of objects which may be located within a specified range of the subject within the surrounding environment.

According to an aspect, the controller 102 is configured to translate information about identified/recognized objects and position and movement of the identified objects relative to the subject into sensory indication information that the sensory output device 210 can utilize to provide sensory output.

According to an aspect, the controller 102 is configured to relay to the subject sensory indication of the detected object(s) and relative position/motion via sensory output responses in the form of tactile, haptic, vibratory, thermal and/or audio feedback via the sensory output device 210. According to an implementation, the sensory output device comprises an electro-mechanical circuit module integrated with a heating component and can be attached to the subject's stomach.

According to an implementation, the controller 102 sends indication of the captured object to a sensory output device 210 to cause the sensory output device 210 to rearrange pins into a specific pattern 508 to allow pinheads to make physical contact with the subject to facilitate object perception. In the example of FIG. 5, the controller 102 causes the sensory output device 210 to rearrange pins into the specific pattern 500 (e.g., a square-shaped pattern) corresponding to the shape of the object 504.

Figure 6:
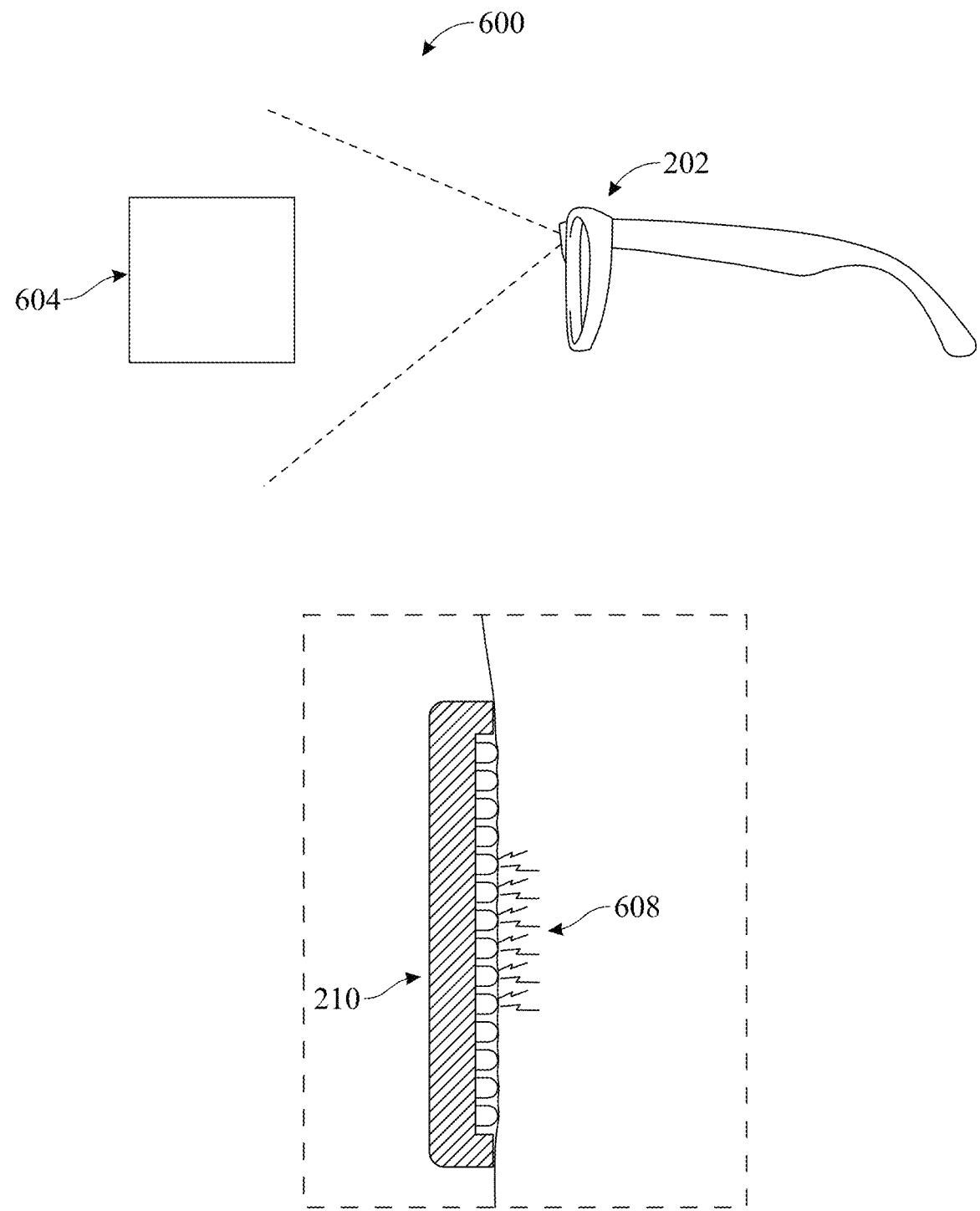
FIG. 6 illustrates an environment sensing DPS capturing an image of an object and sending proximity indication of the captured object to a sensory output device to facilitate temperature based object proximity perception, according to one or more embodiments.

FIG. 6 illustrates an environment sensing DPS capturing an image of an object and triggering and sending proximity indication of the captured object to a sensory output device to facilitate temperature based object proximity perception, according to one or more embodiments. A view 600 shows an image capture device integrated within personal item 202 capturing an image of an example object 604 which is a square-shaped object. In addition, as illustrated in FIG. 6, a side profile view of the sensory output device 210 is provided, enabling a viewer to visualize pins selected for heating on an inner side of the sensory output device 210.

During operation, the controller 102 executing an enhanced environment sensing (EES) utility/module 108 is configured to receive images of a scene surrounding a subject from a camera integrated within the personal item 202 when worn and/or carried by the subject.

According to an aspect, the controller 102 is configured to translate information about identified/recognized objects and position and movement of the identified objects relative to the subject into sensory indication information that the sensory output device 210 can utilize to provide sensory output.

According to an aspect, the controller 102 is configured to relay to the subject sensory indication of the detected object(s) and relative position/motion via sensory output responses in the form of tactile, haptic, vibratory, thermal and/or audio feedback via the sensory output device 210. According to an implementation, the sensory output device comprises an electro-mechanical circuit module integrated with a heating/cooling component and can be attached to the subject's stomach. According to an aspect, the controller 102 may manipulate the pins to indicate when the object is moving closer to or further away from the subject. According to an aspect, the controller may heat selected pins 608 to a specific temperature to indicate a proximity of the object to the subject.

Figure 7:
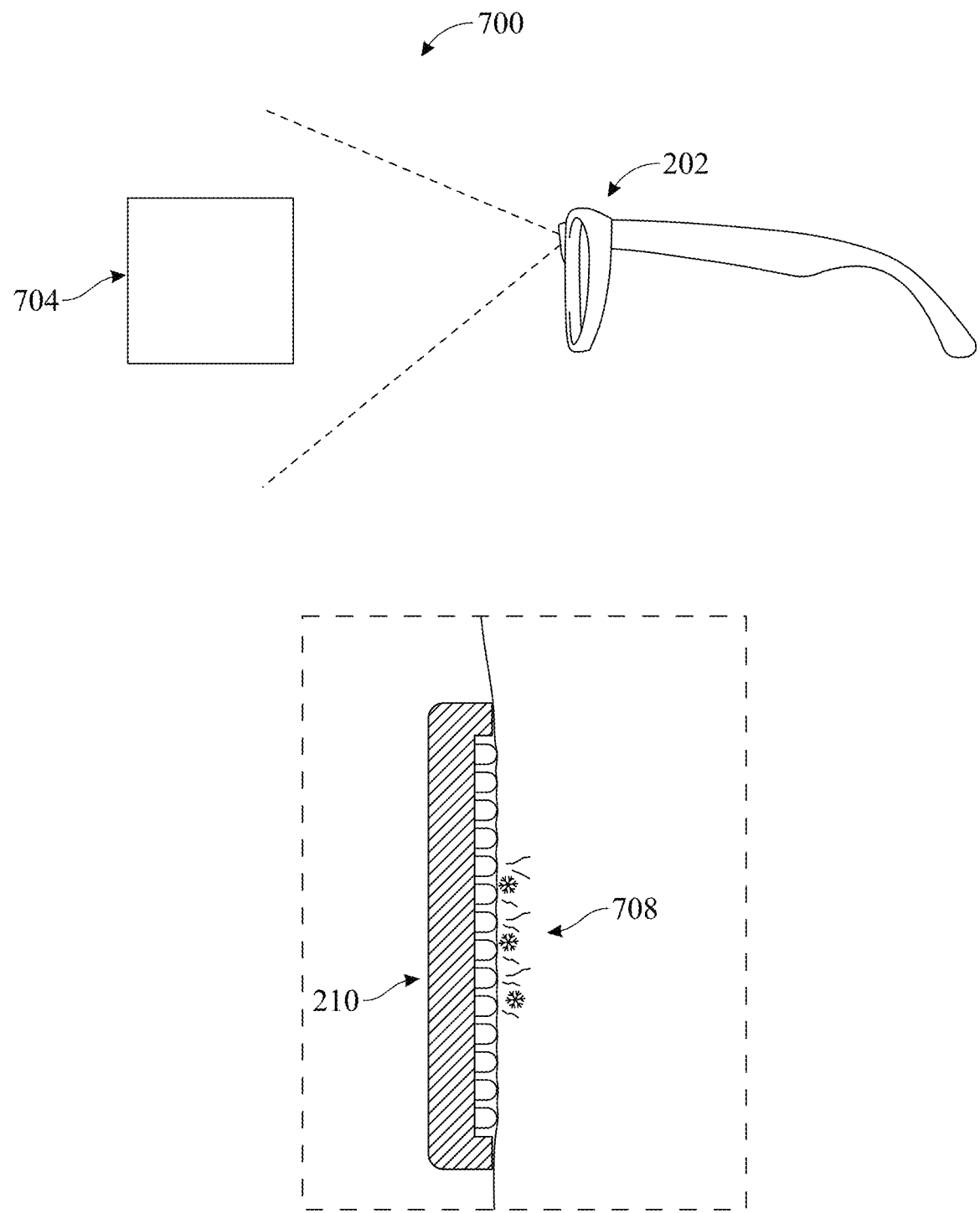
FIG. 7 illustrates an environment sensing DPS capturing an image of an object and sending proximity indication of the captured object to a sensory output device to facilitate object proximity perception by cooling, according to one or more embodiments.

FIG. 7 illustrates an environment sensing DPS capturing an image of an object and sending proximity indication of the captured object to a sensory output device to facilitate object proximity perception by cooling, according to one or more embodiments. A view 700 shows an image capture device integrated within personal item 202 capturing an image of an example object 704 which is a square-shaped object. In addition, as illustrated in FIG. 7, a side profile view of the sensory output device 210 is provided, enabling a viewer to visualize pins selected for cooling on an inner side of the sensory output device 210.

During operation, the controller 102 executing an enhanced environment sensing (EES) utility/module 108 is configured to receive images of a scene surrounding a subject from a camera integrated within the personal item 202 when worn and/or carried by the subject.

According to an aspect, the controller 102 is configured to translate information about identified/recognized objects and position and movement of the identified objects relative to the subject into sensory indication information that the sensory output device 210 can utilize to provide sensory output.

According to an aspect, the controller 102 is configured to relay to the subject sensory indication of the detected object(s) and relative position/motion via sensory output responses in the form of tactile, haptic, vibratory, thermal and/or audio feedback via the sensory output device 210.

According to an implementation, the sensory output device comprises an electro-mechanical circuit module integrated with a heating component and can be attached to the subject's stomach. According to an aspect, the controller 102 may manipulate the pins to indicate when the object is moving closer to or further away from the subject. According to an aspect, the controller may cool selected pins 708 to a selected temperature to indicate a proximity of the object to the subject.

Figure 8:
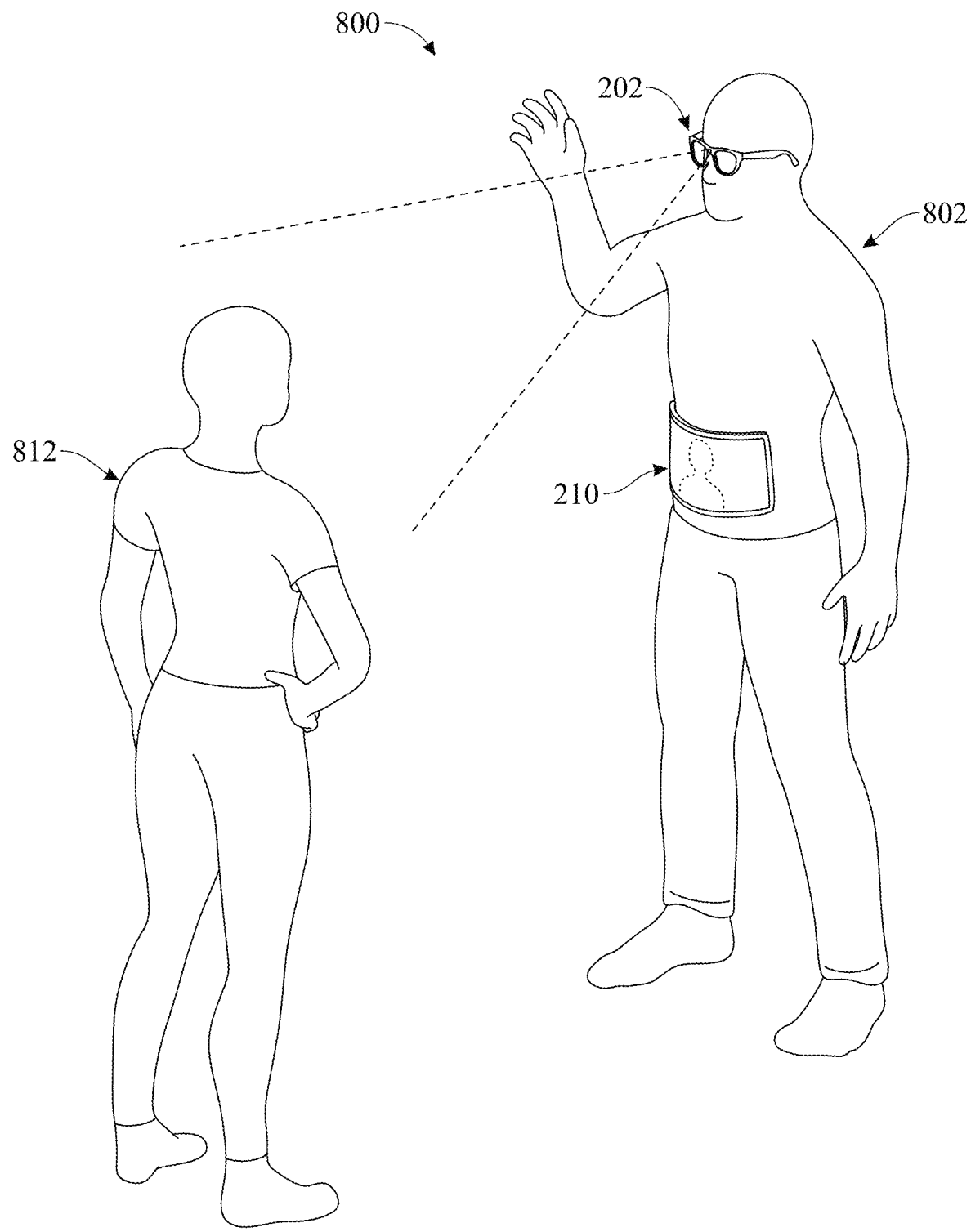
FIG. 8 illustrates an environment sensing DPS capturing an image of a person and sending indication of the person's presence to a sensory output device to facilitate perception of the person's presence by the subject, according to one or more embodiments.

FIG. 8 illustrates an environment sensing DPS capturing an image of a person and sending indication of the person's presence to a sensory output device to facilitate perception of the person's presence by the subject, according to one or more embodiments. The view 800 shows a subject 802 wearing personal item 202 and sensory output device 210 which is secured to the subject's stomach region. In addition, the view 800 shows an individual 812 in proximity to the subject. As illustrated in the view 800, the sensory output device 210 shows an image or other representation of the individual 812 on a display/outer side of the sensory output device 210.

According to an aspect, the presentation of the individual's image via the display notifies the individual 812, particularly someone familiar with use of the ESDPS 200 for enhancing environment perception for the visually impaired, that his/her presence is detected by a visually impaired person/subject. Thus, the individual 812 is able to act accordingly based on the received notification. Furthermore, upon receiving from the sensory output device 210 sensory indication that an individual 812 is positioned at a specific location within proximity of the subject, the subject 802 is able to signal to the individual 812 that he (i.e., the subject) is aware of the individual's presence. For example, the subject 802 may wave to the individual 812 who may be a friend that the subject 802 is scheduled to meet.

Figure 9:
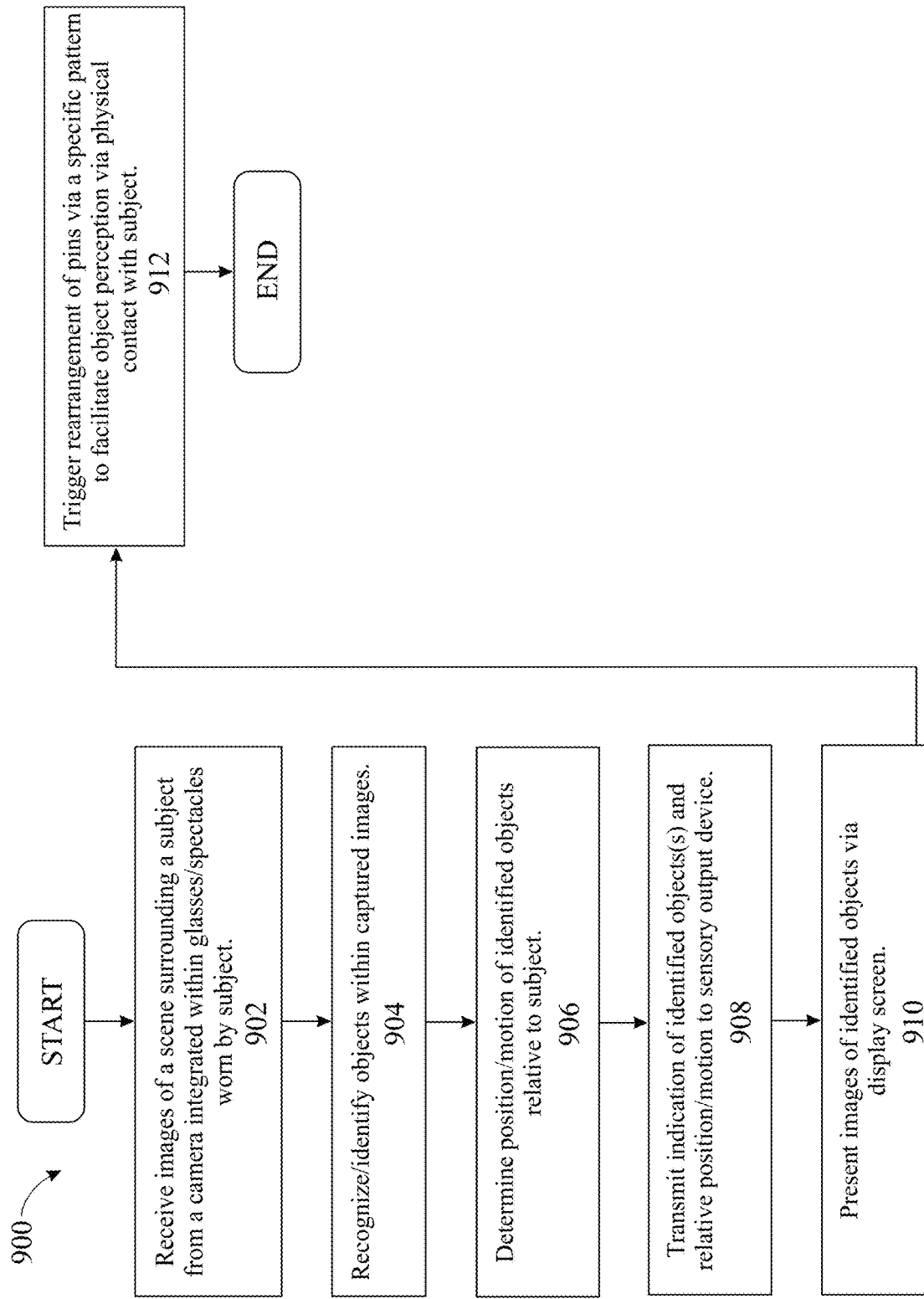
FIG. 9 presents a flow chart illustrating the process of facilitating improved perception of a surrounding environment by a visually impaired subject, according to one or more embodiments.

FIG. 9 is a flow chart illustrating the method by which the above process of the illustrative embodiments is completed. Although the method illustrated in FIG. 9 may be described with reference to components shown in FIGS. 1-8, it should be understood that this is merely for convenience and alternative components and/or configurations thereof can be employed when implementing the various methods. Key portions of the methods may be completed by the enhanced environment sensing (EES) module 108 executing on processor subsystem 102 within DPS 100 (FIG. 1) and controlling specific operations of/on DPS 100, and the methods are thus described from the perspective of either/both the EES module 108 and DPS 100 or other device that provides the functionality associated with one or more versions of the EES module 108.

FIG. 9 presents a flow chart illustrating the process 900 of facilitating improved perception of a surrounding environment by a visually impaired subject, according to one or more embodiments. The process of FIG. 9 begins at the initiator/start block and proceeds to block 902, at which the EES module 108 receives images of a scene surrounding a subject from a camera integrated within glasses (also referred to as spectacles) worn by subject. At block 904, the EES module 108 recognizes/identifies objects within the captured images. According to one or more aspects, the EES module 108 is able to identify selected types of objects which may be located within a specified range of the subject within the surrounding environment.

At block 906, the EES module 108 determines the position and motion of the identified objects relative to the subject. According to an aspect, the EES module 108 determines the position and movements of various objects detectable by the image capture device and/or located less than a threshold distance from the subject.

At block 908, the EES module 108 transmits indication of identified object(s) and relative motion to sensory output device. According to an aspect, the controller 102 is configured to translate information about identified/recognized objects and position and movement of the identified objects relative to the subject into sensory indication information that the sensory output device 210 can utilize to provide sensory output.

At block 910, the EES module 108 presents images of identified objects via the display screen.

Additionally, based on the transmitted indication, the EES module 108 triggers rearrangement of pins via a specific pattern to facilitate object perception via physical contact with the subject, as shown at block 912. According to an aspect, selected pins from among extendable and retractable pins having a grid-like arrangement are extended in a specific order to convey a relative position and/or relative movement of the identified object via physical contact with the subject. The process proceeds to the end block.

As described herein, a method, a system, and a computer program product for enabling improved perception of the surrounding environment by a visually impaired subject is disclosed. A controller executing an enhanced environment sensing (EES) utility/module receives images of a scene surrounding the subject from a camera integrated within glasses (also referred to as spectacles) worn by the subject. The controller identifies objects within the captured images and determines the motion of the detected objects relative to the subject. The controller relays to the subject indication of the detected object(s) and relative motion via sensory responses in the form of tactile, haptic, vibratory, thermal and/or audio feedback via a sensory output device. According to an implementation, the sensory output device comprises an electro-mechanical circuit module integrated with a heating component and can be attached to the user's stomach. Thus, when the cameras sense motion by a detected object, the controller will manipulate pins included within the circuit module to physically interact with the subject to inform him of a presence of the detected object and the direction of the object's motion relative to the subject. In particular, the controller may be configured to cause selected pins within a grid-like arrangement of pins to be extended in a specific order to facilitate object perception via physical contact with the subject. In addition, the controller may manipulate the pins to indicate when the object is moving closer to or further away from the subject. According to an aspect, the controller may heat/cool the pins to various temperatures to indicate a proximity of the object to the subject. According to an aspect, the controller displays images of the captured scene on a screen on an outer side of the sensory output device.

According to one or more aspects, the controller may be configured to identify selected types of objects which may be located within a specified range of the subject within the surrounding environment.

According to an aspect, the controller is configured to translate information about identified/recognized objects and position and movement of the identified objects relative to the subject into sensory indication information that the sensory output device can utilize to provide sensory output.

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention. A description of an embodiment with several components in communication with each other does not imply that all such components are required. On the contrary, a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. "Software" may refer to prescribed rules to operate a computer. Examples of software may include code segments in one or more computer-readable languages; graphical and or/textual instructions; applets; pre-compiled code; interpreted code; compiled code; and computer programs. A network is a collection of links and nodes (e.g., multiple computers and/or other devices connected together) arranged so that information may be passed from one part of the network to another over multiple links and through various nodes. Examples of networks include the Internet, the public switched telephone network, wireless communications networks, wired communications networks, and computer networks (e.g., an intranet, an extranet, a local-area network, or a wide-area network).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media. When a single device or article is described herein, it will be readily apparent that more than one device/article (whether or not they cooperate) may be used in place of single device/article. Similarly, where more than one device or article is described herein (whether or not they cooperate), it will be readily apparent that a single device/article may be used in place of the more than one device or article. The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-transitory, non-volatile media, volatile media, and transmission media. Non-volatile media include, for example, optical or magnetic disks and other persistent memory. Volatile media include dynamic random access memory (DRAM), which typically constitutes the main memory. Transmission media includes coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH-EEPROM, removable media, flash memory, a "memory stick", any other memory chip or cartridge, a carrier wave as described hereinafter, or any other medium from which a computer can read. Various forms of computer readable media may be involved in carrying sequences of instructions to a processor. For example, sequences of instruction may be delivered from RAM to a processor, may be carried over a wireless transmission medium, and/or may be formatted according to numerous formats, standards or protocols, such as Bluetooth®, 4G, 5G, etc.

Where databases are described, it will be understood by one of ordinary skill in the art that alternative database structures to those described may be readily employed, and other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a non-transitory computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units. A "network" may refer to a number of computers and associated devices that may be connected by communication facilities. A network may involve permanent connections such as cables or temporary connections such as those made through the telephone or other communication links. A network may further include hard-wired connections (e.g., coaxial cable, twisted pair, optical fiber, waveguides, etc.) and/or wireless connections (e.g., radio frequency waveforms, free space optical waveforms, acoustic waveforms, etc.). Examples of a network may include: an internet, such as the Internet; an intranet; a LAN; a wide area network (WAN); and a combination of networks.

As noted above, in some embodiments the method or methods described above may be executed or carried out by a computing system including a non-transitory computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a GUI, or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method(s) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method comprising:
   receiving one or more images of a scene surrounding a subject at a current position from an image capture device integrated within a personal item placed on the subject, wherein the scene includes at least one other person in proximity to the current position of the subject;
   identifying at least one object and the at least one other person within the one or more images received;
   determining one or more positions and motion of the at least one object identified relative to the current position of the subject;
   translating information about the at least one object and the at least one other person identified using the one or more positions and motion of the at least one object and the at least one other person determined into at least a sensory indication;
   transmitting the sensory indication to a sensory output device positioned on a body of the subject;
   responsive to the sensory indication transmitted, producing a plurality of sensory responses by the sensory output device;
   applying the plurality of sensory responses produced to the body of the subject through the sensory output device; and
   displaying an image of the at least one other person on a display incorporated into the sensory output device, wherein the display is viewable by the at least one other person and serves as a notification to the at least one other person that their proximity to the current position of the subject has been detected by the sensory output device, wherein in response to the image displayed and the notification that their proximity to the current position of the subject has been detected by the sensory output device the at least one other person modifies their actions accordingly.

2. The method of claim 1, wherein the personal item is worn or carried by the subject.

3. The method of claim 1, wherein the image capture device is a camera.

4. The method of claim 1, wherein the method further comprises:
   identifying a type of the at least one object identified within a specific range of the subject's current position.

5. The method of claim 1, wherein the plurality of sensory responses applied comprise audio feedback.

6. The method of claim 1, wherein the method further comprises:
   rearranging a plurality of pins located on the sensory output device into a specific pattern as part of the plurality of sensory responses applied to the body of the subject, wherein the plurality of pins rearranged make physical contact with the body of the subject.

7. The method of claim 6, wherein the method further comprises:
  manipulating the plurality of pins to facilitate a perception of movement in one or more directions.

8. The method of claim 6, wherein the method further comprises:
  extending one or more pinheads associated with one or more pins of the plurality of pins in a specific order to provide a vertically directed pattern; and
  cooling or heating the one or more pinheads extended to a target temperature for indicating a proximity of the at least one object to the subject.

9. The method of claim 1, wherein the sensory output device is attached externally to a stomach region of the subject.

10. The method of claim 1, wherein the method further comprises:
  displaying an image of the person on the sensory output device.

11. The method of claim 6, wherein the method further comprises:
  manipulating the plurality of pins for indicating when the at least one object identified is moving closer to or further away from the subject.

12. The method of claim 8, wherein the method further comprises:
  selecting the a target temperature based on one or more attributes of the body of the subject.

13. The method of claim 1, wherein the personal item is a pair of eyeglasses.

14. A method comprising:
  receiving one or more images of a scene surrounding a subject at a current position from an image capture device integrated within a personal item placed on the subject, wherein the image capture device is a camera and the scene includes at least one other person in proximity to the current position of the subject;
  identifying at least one object and the at least one other person within the one or more images received;
  determining one or more positions and motion of the at least one object and the at least one other person identified relative to the current position of the subject;
  translating information about the at least one object and the at least one other person identified using the one or more positions and motion of the at least one object and the at least one other person determined into at least a sensory indication;
  transmitting the sensory indication to a sensory output device positioned on a body of the subject;
  responsive to the sensory indication transmitted, producing a plurality of sensory responses by the sensory output device;
  applying the plurality of sensory responses produced to the body of the subject through the sensory output device by at least rearranging a plurality of pins located on the sensory output device into a specific pattern as part of the plurality of sensory responses applied to the body of the subject, wherein the plurality of pins rearranged make physical contact with the body of the subject; and
  displaying an image of the at least one other person on a display incorporated into the sensory output device, wherein the display is viewable by the at least one other person and serves as a notification to the at least one other person that their proximity to the current position of the subject has been detected by the sensory output device, wherein in response to the image displayed and the notification that their proximity to the current position of the subject has been detected by the sensory output device the at least one other person modifies their actions accordingly.

15. The method of claim 14, wherein the method further comprises:
  identifying a type of the at least one object identified within a specific range of the subject's current position.

16. The method of claim 14, wherein the method further comprises:
  extending one or more pinheads associated with one or more pins of the plurality of pins in a specific order to provide a vertically directed pattern; and
  cooling or heating the one or more pinheads extended to a target temperature for indicating a proximity of the at least one object to the subject.

17. The method of claim 14, wherein the plurality of sensory responses applied comprise audio feedback.

18. A method comprising:
  receiving one or more images of a scene surrounding a subject at a current position from an image capture device integrated within a personal item placed on the subject, wherein the image capture device is a camera, and the personal item is a pair of eyeglasses, and wherein the scene includes at least one other person in proximity to the current position of the subject;
  identifying at least one object and the at least one other person within the one or more images received;
  determining one or more positions and motion of the at least one object and the at least one other person identified relative to the current position of the subject;
  translating information about the at least one object and the at least one other person identified using the one or more positions and motion of the at least one object and the at least one other person determined into at least a sensory indication;
  transmitting the sensory indication to a sensory output device attached externally to a stomach region of the subject;
  responsive to the sensory indication transmitted, producing a plurality of sensory responses by the sensory output device, wherein the plurality of sensory responses applied comprise audio feedback;
  applying the plurality of sensory responses produced to the body of the subject through the sensory output device by at least rearranging a plurality of pins located on the sensory output device into a specific pattern as part of the plurality of sensory responses applied to the body of the subject, wherein the plurality of pins rearranged make physical contact with the body of the subject;
  extending one or more pinheads associated with one or more pins of the plurality of pins in a specific order to provide a vertically directed pattern;
  cooling or heating the one or more pinheads extended to a target temperature for indicating a proximity of the at least one object to the subject; and
  displaying an image of the at least one other person on a display incorporated into the sensory output device, wherein the display is viewable by the at least one other person and serves as a notification to the at least one other person that their proximity to the current position of the subject has been detected by the sensory output device, and wherein in response to the image displayed and the notification that their proximity to the current position of the subject has been detected by the sensory output device the at least one other person modifies their actions accordingly.

19. The method of claim 18, wherein the method further comprises:

identifying a type of the at least one object identified within a specific range of the subject's current position.

* * * * *